(12) United States Patent
Auslander et al.

(10) Patent No.: US 7,926,730 B2
(45) Date of Patent: Apr. 19, 2011

(54) COMBINED MULTI-SPECTRAL DOCUMENT MARKINGS

(75) Inventors: Judith D. Auslander, Westport, CT (US); William T. Shannon, Shelton, CT (US); Robert A. Cordery, Danbury, CT (US); Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1535 days.

(21) Appl. No.: 11/290,728

(22) Filed: Nov. 30, 2005

(65) Prior Publication Data

US 2007/0119951 A1     May 31, 2007

(51) Int. Cl.
*G06K 19/06*     (2006.01)
*G06K 19/00*     (2006.01)

(52) U.S. Cl. .................. 235/494; 235/487; 235/491

(58) Field of Classification Search .................. 235/375, 235/435, 439, 454, 487, 494
See application file for complete search history.

(56) References Cited

U.S. PATENT DOCUMENTS

| | | | |
|---|---|---|---|
| 3,034,643 A | 5/1962 | Kuehnle et al. | |
| 3,504,907 A | 4/1970 | Barber et al. | |
| 4,979,626 A | 12/1990 | Pitts | |
| 5,153,418 A | 10/1992 | Batterman et al. | |
| 5,502,304 A | 3/1996 | Berson et al. | |
| 5,525,798 A | 6/1996 | Berson et al. | |
| 5,542,971 A | 8/1996 | Auslander et al. | |
| 5,674,314 A | 10/1997 | Auslander et al. | |
| 5,693,693 A | 12/1997 | Auslander et al. | |
| 5,698,839 A | 12/1997 | Jagielinski et al. | |
| 5,710,420 A * | 1/1998 | Martin et al. ................ 235/487 |
| 5,919,846 A | 7/1999 | Batlaw et al. | |
| 5,946,414 A * | 8/1999 | Cass et al. .................... 382/183 |
| 5,974,171 A | 10/1999 | Hayashi et al. | |
| 6,005,002 A | 12/1999 | Springer et al. | |
| 6,039,257 A | 3/2000 | Berson et al. | |
| 6,268,222 B1 | 7/2001 | Chandler et al. | |
| 6,284,027 B1 | 9/2001 | Auslander et al. | |
| 6,576,155 B1 | 6/2003 | Barbera-Guillem | |

(Continued)

FOREIGN PATENT DOCUMENTS

DE     19631887 C2     2/1998

(Continued)

OTHER PUBLICATIONS

Sun, S., et al., Monodisperse Fe Pt Nanoparticles and FerroMagnetic Nanocrystal Superlattices, Science vol. 287, pp. 1989-1992 (Mar. 17, 200).

(Continued)

*Primary Examiner* — Thien M. Le
*Assistant Examiner* — April A Taylor
(74) *Attorney, Agent, or Firm* — George M. Macdonald; Steven J. Shapiro; Charles R. Malandra, Jr.

(57) ABSTRACT

A document printed marking including a first information marking including first luminescent taggants having a first luminescence wavelength band; and a second information marking printed at least partially on the first information marking at an overlap location. The second information marking includes second different luminescent taggant having a second different luminescence wavelength band. The second luminescence wavelength band is spaced from the first luminescence wavelength band such that the first information marking and the second information marking are substantially luminescently non-intrusive with each other at the overlap location.

3 Claims, 7 Drawing Sheets

U.S. PATENT DOCUMENTS

| | | | |
|---|---|---|---|
| 6,585,163 B1* | 7/2003 | Meunier et al. | 235/487 |
| 6,793,138 B2 | 9/2004 | Saito | |
| 6,793,723 B2 | 9/2004 | Auslander et al. | |
| 6,827,769 B2 | 12/2004 | Auslander et al. | |
| 6,835,326 B2 | 12/2004 | Barbera-Guillem | |
| 6,859,275 B2 | 2/2005 | Fateley et al. | |
| 7,222,745 B2* | 5/2007 | Gutierrez et al. | 220/675 |
| 7,229,025 B2* | 6/2007 | Sussmeier et al. | 235/494 |
| 7,357,321 B2 | 4/2008 | Yoshida et al. | |
| 7,428,996 B2 | 9/2008 | Pintsov et al. | |
| 7,470,731 B2 | 12/2008 | Sanchez et al. | |
| 2002/0057431 A1 | 5/2002 | Fateley et al. | |
| 2002/0195586 A1 | 12/2002 | Auslander et al. | |
| 2003/0005303 A1 | 1/2003 | Auslander et al. | |
| 2003/0006170 A1* | 1/2003 | Lawandy | 209/3.3 |
| 2003/0039505 A1* | 2/2003 | Rew | 402/73 |
| 2003/0041774 A1 | 3/2003 | Auslander et al. | |
| 2003/0062422 A1 | 4/2003 | Fateley et al. | |
| 2004/0241424 A1* | 12/2004 | Barbera-Guillem | 428/326 |
| 2005/0040234 A1 | 2/2005 | Euchner et al. | |
| 2005/0087605 A1 | 4/2005 | Auslander et al. | |
| 2005/0088500 A1 | 4/2005 | Auslander | |
| 2005/0102332 A1 | 5/2005 | Reiffel | |
| 2007/0104323 A1 | 5/2007 | Hammell et al. | |
| 2007/0119950 A1 | 5/2007 | Auslander et al. | |

FOREIGN PATENT DOCUMENTS

| | | |
|---|---|---|
| EP | 1176543 A1 | 1/2002 |

OTHER PUBLICATIONS

Gaponenko, S. V., Optical Properties of Semiconductor Nanocrystals, Cambridge University Press, 1998, pp. 117-121.

Alivisatos, A. P., Semiconductor Clusters, Nanocrystals and Quantum Dots, Science vol. 271, No. 5251, pp. 933-937 (Feb. 16, 1996).

Yang, C., et al., Synthesis of Alkyl-Terminated Silicon Nanoclusters by a Solution Route, J. Am. Chem. Soc. 1999, vol. 121, pp. 5191-5195.

Peterson, K.E., Silicon Torsional Scanning Mirror, IBM J. R&D, v. 24, p. 631-37 (1980).

Dejneka, M.J. et al., Rare earth-doped glass microbarcodes, PNAS Jan. 21, 2003 vol. 100 No. 2 389-393.

Chang, S., et al., Information coding and retrieving using fluorescent semiconductor nanocrystals for object identification, vol. 12, No. 1, Optics Express, Jan. 12, 2004, pp. 143-148.

Officer, S., et al., Novel Security system based on rare earth doped glass microbeads, Optical Document Security conference, Proceedings of SPIE, 2004.

Unknown, UPU/CEN Mail Communication System Reference Model: General Concepts and Entity Relationship Model, Draft Version 2.1. Sep. 12, 2005.

Burr, The Nanotech Land Grab, Corporate Legal Times, Jun. 2004, pp. 32-39 (7 pages).

Unknown, evidenttech.com/applications/quantum-dot-ink.php, accessed May 3, 2005 (3 pages).

Unknown, chromeon.com/catalog/print/nanoparticles (2 pages).

Unknown, Market Highlight, Biomed Outsourcing Report, vol. 2, Issue 3, 2003, pp. 1-9.

Dubertret, B, et al., In Vivo Imaging of Quantum Dots Encapsulated in Phospholipid Micelles, Science, vo. 298, Nov. 29, 2002, pp. 1759-1762.

Wu, X., et al., Immunoflourescent Labeling of Cancer Marker Her2 and Other Cellular Targets with Semiconductor Quantum Dots, 2002 (6 pages).

* cited by examiner

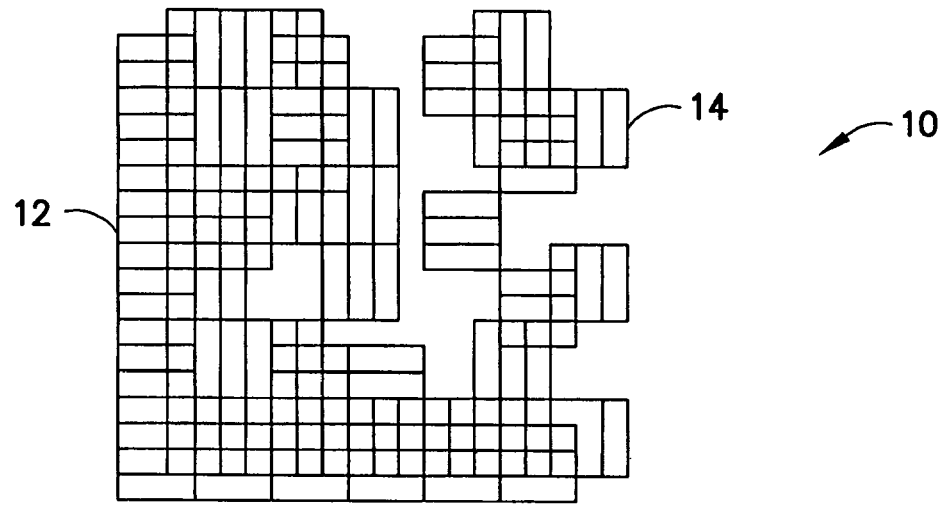
MSET WITH CHANNEL 1
AND CHANNEL 2
FIG.1A
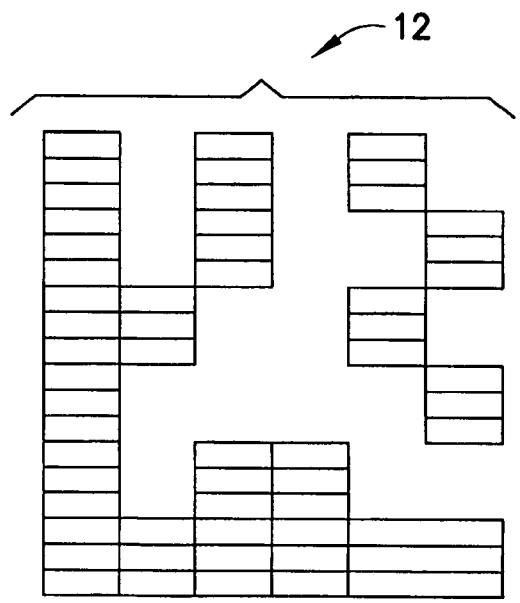 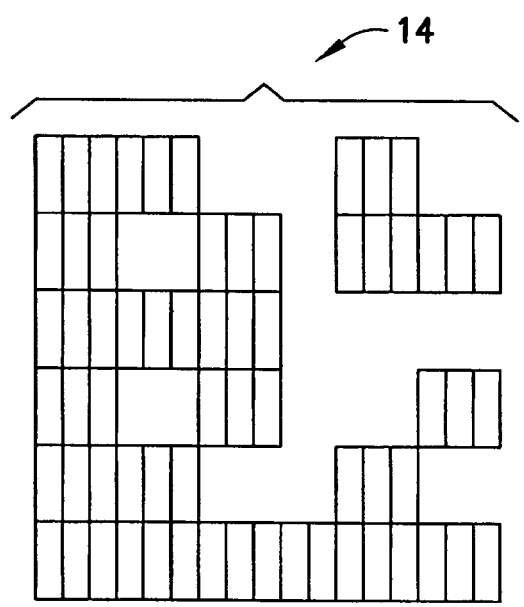
MSET CHANNEL 1
FIG.1B
MSET CHANNEL 2
FIG.1C

COMBINED MULTI-SPECTRAL DOCUMENT MARKINGS

BACKGROUND OF THE INVENTION

1. Field of the Invention

The invention relates to printing and detecting markings and, more particularly, to a marking having multi-spectral characteristics.

2. Brief Description of Prior Developments

Mailers and postal services print barcodes on envelopes or labels attached to mail pieces. The barcodes are used to provide information related to processing the mail piece. A POSTNET code, provided by the mailer or consolidator, provides destination address information to the postal service sorters. A PLANET code printed by the mailer is a request to provide simple feedback when a mail piece is processed. Linear barcodes printed on mail pieces must be isolated from each other and from other printed matter on the mail piece. Mail carriers scan bar code labels attached to mail pieces by mailers when they request value-added services such as delivery confirmation. These labels tend to be large and can obscure other information on mail pieces.

Postal services print a mail piece identifier using a lightly colored fluorescent bar code known as a postal-ID tag. The postal-ID tag fluoresces in a broad wavelength band in the orange region and can be excited with broadband ultraviolet light. The fluorescent emission of paper on the mail piece, such as that produced by optical brighteners used in paper manufacturing, and the fluorescence of the postal ID tag, have broad overlapping spectral features, the postal sorter's detection system can be confused. In some cases the fluorescent signal of the ID tags may be diminished by the interfering fluorescence of the optical brighteners.

Postage meters can print indicia with two-dimensional barcodes that provide postage payment evidence. The indicium barcode can include value-added service requests. The provider of that value-added service would have to read every barcode to find the ones that actually request service.

Color barcodes are known, such as the barcode disclosed in U.S. Pat. No. 6,793,138, that increase the information density of printed barcodes. The broad absorption band of the individual colors limits the increase in information density to about three to five times the density of a monochrome code. If several colors are printed in one area, it is difficult to distinguish the different colors. One of the earliest implementation of color barcodes is on small electronic resistors to encode resistance value.

Similar to the use of color, spectral mixtures of fluorescent dyes can increase information density. The dyes have broad emission spectra and a wide range of excitation wavelengths varying from short UV to visible. They also often have a small Stokes shift; i.e., difference between the excitation wavelength and emission wavelength. These properties conspire to make the detection systems more costly and complicated. As in the case of color barcodes, since there are strong overlaps between the emission bands of various fluorescent dyes, the increase in information density is limited. Invisible barcodes are known that can be either luminescent or infrared absorbing. They can be printed over visible information without obscuring the visible information. The known invisible bar codes also have broad spectral features.

All of the symbols and inks described above suffer a common limitation because they are printed with inks that have broad overlapping spectral features. The symbols must, therefore, be printed on different regions of the envelope. Parties participating in the mail stream process suffer the problems of printing symbols without interfering with information that is already there. As an example, consider the POSTNET barcode that identifies the delivery point. A mailer may print an incorrect POSTNET code and deliver the mail piece to a consolidator. The consolidator may print a new barcode, correcting the POSTNET to agree with the address, in the space reserved for higher priority POSTNET codes along the bottom edge of the envelope. The postal service may realize that the recipient has moved and want to print a new POSTNET for the forwarding address. Unfortunately, there is no space assigned for this third POSTNET code. Typically the post follows the inconvenient and obtrusive process of placing a label with the new code over the existing POSTNET code.

"UPU/CEN Mail Communication System Reference Model: General Concepts and Entity Relationship Model", Draft Version 2.1. Sep. 12, 2005, which is hereby incorporated by reference in its entirety, describes the parties and processes that take part in a mail process. There are multiple applications for communicating via bar codes on the envelopes. The inks used in postal applications typically have broad emission and absorption spectra. The spectra overlap and interfere with each other. Due to the limited area of the envelope the postal service issues regulations that define the required placement of bar codes, clear zones and other information on a mail piece. The resulting mail piece can be cluttered and confusing.

Limited amounts of information can be encoded in the bar codes due to the use of monochromatic inks (black or other colors) and broadband single channel reflectance-based contrast. Readability is dependent on print contrast, which requires high loading of colorant, causing reliability issues for inks. Postal applications need high-density information to enable services, mail piece identification, and postage cryptographic evidencing. Because there is a large number of information fields on the mail piece, there is a strong dependence on registration, printing sequence, and positioning for postal processing of high volumes of mail.

Hand-held scanners lack precise orientation and positioning. Typically each application, on a document having multiple bar codes, uses a separate type of bar code to help with identifying which bar code is for which purpose.

Conventional bar codes are obtrusive, taking a large space on the envelope and making it difficult to see additional information such as ad slogans, addresses, etc. It can be difficult to find a particular bar code and distinguish its signal from the other information.

The limited information capacity of envelopes, and the static nature of information on envelopes gives rise to a need for a database linked to the mail piece information. Maintaining and providing remote access to this database can be expensive, time consuming and technically challenging.

The ease of copying postage indicium barcodes means that it is necessary to detect duplicates based on the information recovered from duplicate mail pieces. Achieving a high duplicate detection rate means that most mail pieces should be scanned and recorded in a duplicates database. The resulting complex infrastructure adds to the cost of the postal process. Previous security inks such as those described in U.S. Patent Application Publication No. 2005/0040234 (Euchner/Auslander) describes printing indicia with ink characteristics such as color and luminescence of mixtures of organic fluorescent dyes. These are all very low-resolution characteristics with overlapping reflectance or luminescence spectra.

Inks with narrow band fluorescence spectra use fluorescent nanoparticle quantum dots or rare earth-doped nanoparticles. Suitable rare earth-doped nanoparticles for incorporating in an ink are described in "Rare earth-doped glass microbarcodes" by Matthew J. Dejneka et al. Evident Technologies manufactures inks for anti-counterfeiting using semi-conducting quantum dots. The use of quantum dots in inks to provide high information density in very small spots has been described in "Information coding and retrieving using fluorescent semiconductor nanocrystals for object identification" by Shoude Chang, et al. in 12 Jan. 2004/Vol. 12, No. 1/OPTICS EXPRESS pg 143. The fluorescent nanoparticle inks described by Barbera-Guillem of BioCrystal, Ltd. in U.S. Pat. Nos. 6,835,326 and 6,576,155 use only the fluorescent characteristics, but not the phosphorescence of the rare earth oxides as additional parameters (for example the decay time). Barbera-Guillem further uses excitation wavelength for the rare earth oxides above 300 nm. The encoded information is limited because they use only monochrome emission wavelength modules in the encoded data without using their combined wavelength in fixed ratio. The comparison of the encoded data to a database such as described in U.S. Patent Application Publication No. 2004/0241424 can be cumbersome and involves handling of a lot of data that is not suitable for a postal application.

Principals participating in the mail generation and distribution process would like to provide information downstream to aid in correct processing of a mail item. There are many such players, and they frequently use bar codes to communicate. Using multiple barcodes results in several problems. The mail item becomes very busy and unattractive. There is confusion in identifying the correct information, so that the postal service must place labels over superceded information. The lack of space on the mail item makes aligning on a clear area difficult. Possible services or corrections are simply not introduced because of the difficulties mentioned.

SUMMARY OF THE INVENTION

In accordance with one aspect of the invention, a document printed marking is provided including a first information marking including first luminescent taggants having a first luminescence wavelength band; and a second information marking printed at least partially on the first information marking at an overlap location. The second information marking includes second different luminescent taggant having a second different luminescence wavelength band. The second luminescence wavelength band is spaced from the first luminescence wavelength band such that the first information marking and the second information marking are substantially luminescently non-intrusive with each other at the overlap location.

In accordance with another aspect of the invention, a mail piece is provided comprising a first information marking containing first luminescent particles having a first luminescence wavelength narrow bandwidth; and a second information marking printed at least partially on the first information marking. The second information marking comprises second different luminescent particles having a second different luminescence wavelength narrow bandwidth. The first information marking and the second information marking are distinguishably luminescently readable.

In accordance with one method of the invention, a method of printing on a document is provided comprising printing a first information marking on a document, wherein the first information marking comprises first luminescent particles; printing a second information marking at least partially on the first information marking, wherein the second information marking comprises luminescent particles. The first luminescent particles and the second luminescent particles are adapted to luminesce at different wavelengths.

In accordance with another method of the invention, a method of reading a multi-spectral marking on a document is provided comprising reading by luminescence a first marking of the multi-spectral marking having first luminescent particles; reading by luminescence a second marking of the multi-spectral marking having second different luminescent particles; and prioritizing information contained in the first marking versus information contained in the second marking based upon a predetermined prioritization of actions.

In accordance with another method of the invention, a method of handling a mail piece is provided comprising reading by luminescence a first marking of a multi-spectral marking on the mail piece while the mail piece is being processed by a mail handling machine, wherein the first marking comprises first luminescent particles; and when the first marking is determined to comprise a predetermined characteristic, automatically removing the mail piece from the mail handling machine; and processing the mail piece based upon information contained in the first marking.

In accordance with another method of the invention, a method of printing a document marking is provided comprising printing a first marking with a carrier comprising first luminescent particles; and printing a second marking with a carrier comprising second different luminescent particles. The first marking and the second marking combine to form a multi-spectral overlapping marking at a same space. The first marking and the second marking are substantially luminescently non-intrusive with each other such that the first marking and the second marking are adapted to be independently luminescently distinguishably read.

BRIEF DESCRIPTION OF THE DRAWINGS

The foregoing aspects and other features of the invention are explained in the following description, taken in connection with the accompanying drawings, wherein:

FIG. 1A illustrates a Multi-Spectral Encoded Tags (MSETS) with two MSET channels;

FIG. 1B illustrates a first one of the MSET channels used to form the MSETS shown in FIG. 1A;

FIG. 1C illustrates a second one of the MSET channels used to form the MSETS shown in FIG. 1A;

DETAILED DESCRIPTION OF THE PREFERRED EMBODIMENTS

Figure 1D:
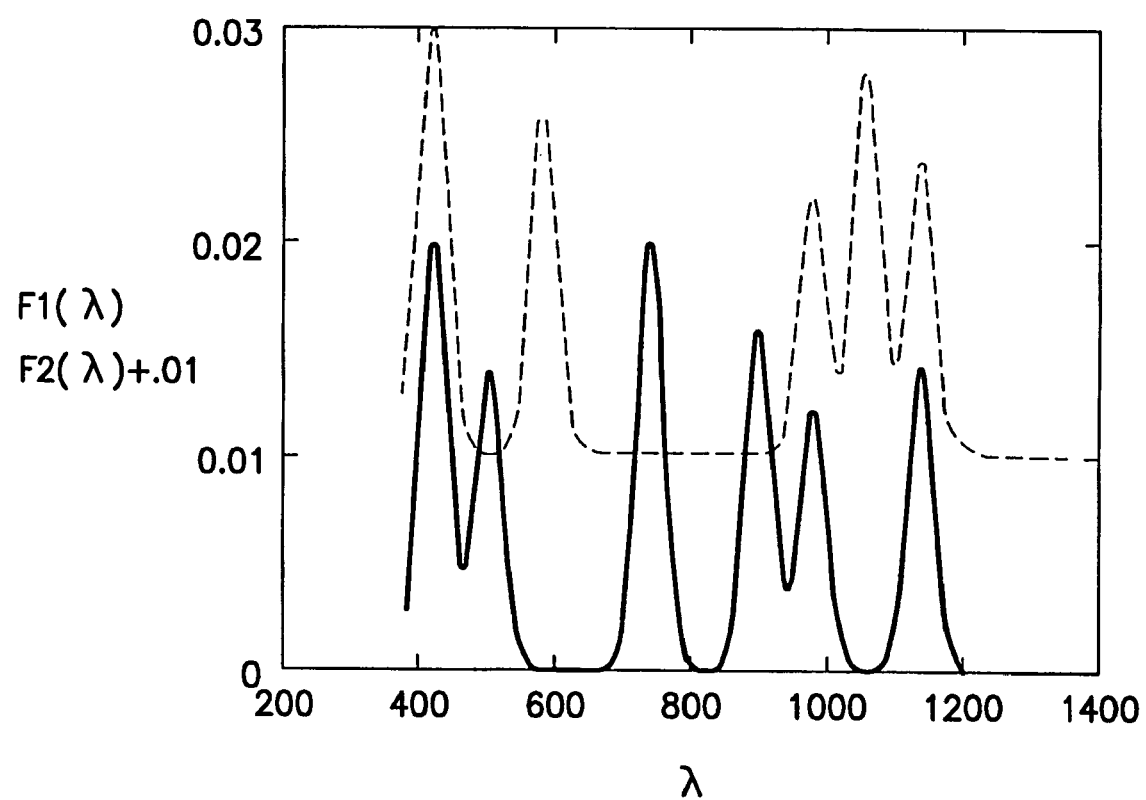
FIG. 1D is a chart showing an example of emission spectrum from one region of an example MSET.

Referring to FIG. 1A, there is shown a plan view of a marking 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used. Although the use of MSETS is described applied to a postal service, embodiments applying MSETS to other multi-step processes such as document management, health care, insurance forms, legal documents, etc. are included within the scope of the invention.

The marking 10 generally comprises a combination of two separate sub-component markings 12, 14 shown in FIGS. 1B and 1C. In alternate embodiments, more than two sub-component markings could be provided. In the embodiment shown in FIG. 1A the marking 10 is preferably printed, such as with an ink jet printer for example, on a substrate or document. Although the example in FIG. 1A shows two information markings 12, 14 printed with each other to form a unified combined marking 10, features of the invention could be used with spatially separate markings. The markings 12, 14 are shown partially overlapping each other in FIG. 1A, however, the markings 12, 14 could be adjacent each other or completely overlapping each other. The markings 12,14 are created using only one narrow bandwidth taggant, but in alternate embodiments, one or both of the markings could be used to form more than one narrow band taggant. One of the markings 12 or 14 might not necessarily utilize a luminescent taggant.

In the embodiment shown in FIG. 1A, the combined markings 12, 14 can convey a first type of data which is visible in natural light. The identity of the taggant(s) in the first marking 12 can identify a second type of data. The identity of the taggant(s) in the second marking 14 can identify a third type of data. Combinations of the first and second taggants can identify a fourth type of data. Thus, the invention allows a high density of information to be stored in a same space.

The second through fourth data types could be used in conjunction with the first data type, such as for error correction or data redundancy. Alternatively, the second through fourth data types could be used entirely separately from the first data type. Identity of a taggant in a marking could be used with a look-up table to look up stored information. Alternatively, identity of a taggant in a marking could be used as an input to an algorithm to give instructions or for error correction and other purposes.

The FIG. 1D shows an example of the fluorescent emission spectra from two different regions of an MSET with 10 different wavelength bands with centers between 420 and 1200 nm with width 20 nm. The first region shown with a solid curve encodes the ten bits 1100101101. The emission from the second region with an offset dashed curve encodes the bits 1010000111.

Figure 2:
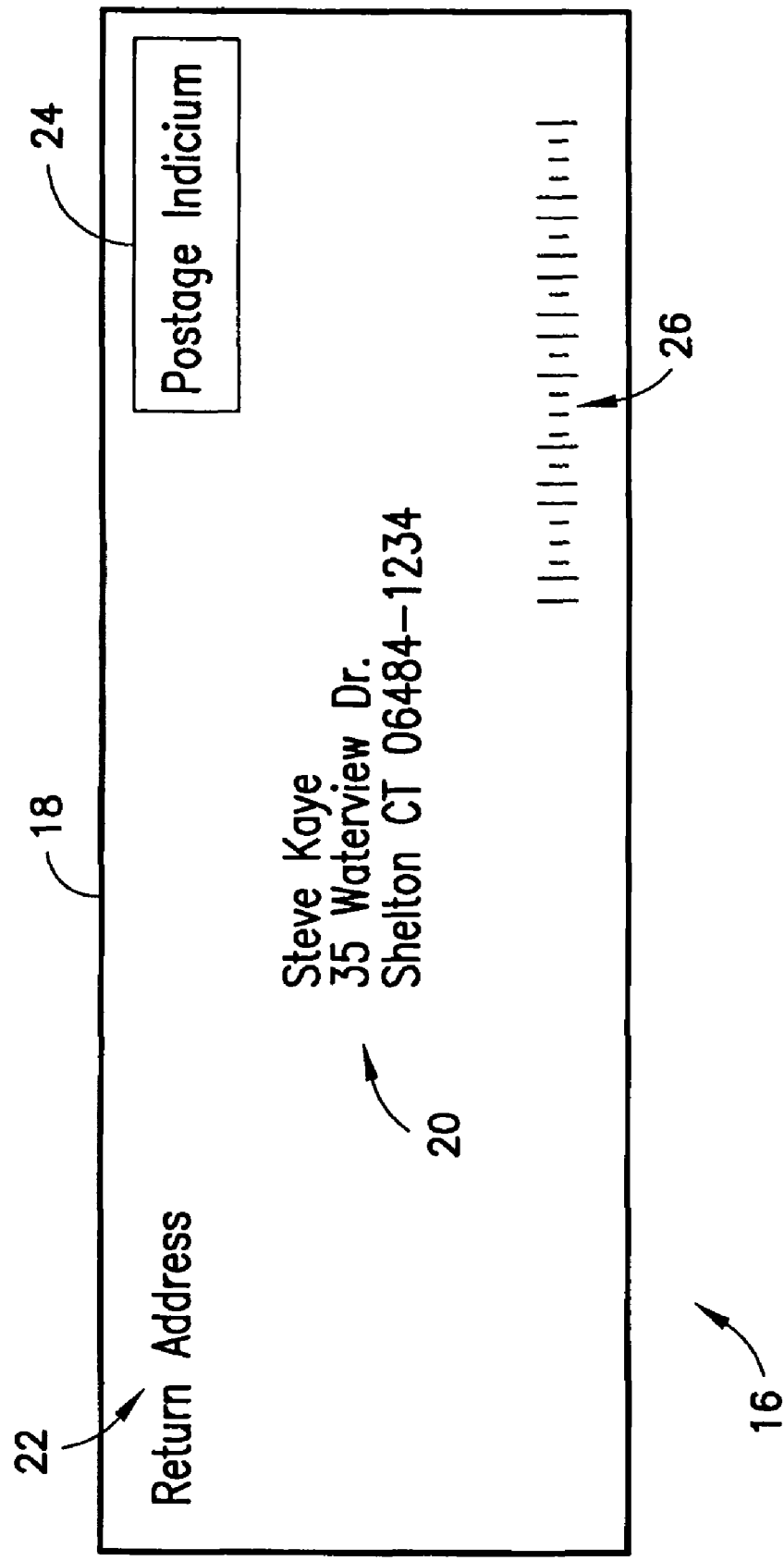
FIG. 2 is a plan view of an envelope having multiple markings which can comprise a MSET of the invention.

FIG. 2 shows an example where the document is a mail piece 16. More specifically, the mail piece is an envelope, but the marking could be provided on any suitable document or substrate, such as a label for example. The envelope 16 comprises a substrate 18 and various postal markings such as a delivery address marking 20, a return address marking 22, a postage indicium 24 and a POSTNET bar code 26. Additional or alternative markings could be provided. One or more of the markings 20-26 could be printed with a multi-component marking as shown in FIGS. 1A-1C.

Printing of postage indicium with a color metameric ink or for example luminescent ink such as a fluorescent ink or a phosphorescent ink, is described in U.S. patent application Ser. No. 10/692,569 filed Oct. 24, 2003, which is hereby incorporated by reference in its entirety. The definition of a metameric ink used herein includes inks that can have different characteristics under certain conditions versus the ink's color under ambient lighting. Dark color fluorescent inks (e.g., dual luminescent) are described in U.S. Pat. Nos. 6,827, 769; and 6,793,723; and U.S. patent application publication Nos. US 2002/0195586 A1, US 2003/0005303 A1, and US 2003/0041774 A1, which are hereby incorporated by reference in their entireties. U.S. patent application Ser. No. 10/692,570, which is hereby incorporated by reference in its entirety, describes halftone printing and gray scale printing with multi-signal transmission ink. U.S. Pat. No. 5,153,418 discloses multiple resolution machine readable symbols.

The invention can use spectral encoded tags, and methods for producing such tags, for communicating between parties in a multi-party process. In particular the invention can use spectral encoded tags employing a set of narrow-band luminescent taggants such as quantum dots in a carrier, such as ink for example. The carrier with the taggants can be printed on a substrate or document to form a marking or a sub-component of a marking. Multiple different carriers with multiple different taggants could be printed to form a multi-spectral marking as seen in FIG. 1A.

A Multi-Spectral Encoded Tag (MSET) is an image that contains multiple separately detectable luminescent particles such as rare earth complexes, oxides, embedded in silica matrix nanoparticles, etc. or semiconductor quantum dots. FIG. 1A shows one example of a MSETS where a small rectangular area printed with a single taggant encodes one bit of information. The luminescent particles can be manufactured or separated into multiple groups such that each group can be excited in a narrow bandwidth referred to as an MSET channel. The groups can be selected so that the excited emission bands of the different MSET channels are spaced or have minimal overlap. In FIGS. 1B and 1C MSET channels 1 and 2, respectively, are illustrated separately which form the combined MSETS shown in FIG. 1A. MSET channel 1 contains a barcode illustrated with rectangular modules with horizontal lines. MSET channel 2 is illustrated with rectangular modules with vertical lines. The actual modules would preferably be printed solid with an ink or carrier containing an appropriate narrow band group luminescent nanoparticles. The spectral encoded tags disclosed herein can luminesce in narrow wavelength bands. An application, such as mail processing and distribution, can define a set of wavelength bands with little overlap for the different taggants. In the following, each wavelength band for each different taggant is called an MSET channel. MSET channels do not interfere with each other when printed in the same location or closely adjacent location. Thus, a MSETS overcomes the difficulty with physical overlap of symbols noted above in the prior art. Printing with the use of quantum dots excited indiscriminately by a broad UV light (250-400 nm) removes the need for masking by using UV absorbers because the inks, ink carrying the taggants can be printed overlapping each other without blocking the excitation signature from excited quantum dots in the overlapped marking.

The nanoparticles may be of a varied nature and include, but are not limited to, quantum dots (QD), luminescent semiconductor nanoparticles and rare earth dopes glass beads, as described in further detail-.below. The wavelength and intensity spectral attributes of these nanoparticles due to their defined, narrow, multiple frequencies can be used to encode information. Thus, according to an embodiment of the invention, a MSET is a combination of different luminescent nanotaggants with unique different spectral features. The total number of possible MSETSs is the number of distinguishable intensity levels raised to the power of the number of distinguishable nanotaggants. For examples, a MSET with 10 taggants and three distinguishable levels has 59000 values or approximately 16 bits. The amount of encoded data will increase as the number of distinguishable taggants and levels increases. This technology can be used for variable data printing for document security, object identification, tracking and other document management applications.

The advantages of this technology when compared with 1D or 2D bar codes, which needs space to arrange the ordered data, is that multi-spectral encoding can increase the density of the information by more than an order of magnitude while improving readability. The information can be invisible to the naked eye. Alternatively, the fluorescent multispectral encoding can use colored inks so that an observer can see that the information is printed. Preferably, inks are lightly colored with print reflectance difference less than 0.5 so that fluorescence is not quenched. Bar codes which are sequence (1D) or pixel (registration) dependent (2D) are rotation and position dependent and, therefore, often require bulky and complex decoders and readers. The subject MSET can be detected with a fluorospectrophotometer through simple fiber optics connections. Due to the high fluorescent intensity of the quantum dots (no self quenching occurs such as in the organic dyes case) Only a small amount of nanotaggant, for example, about 1 wt. % is needed to create a high contrast signal.

As noted above, several categories of nanoparticles can be used for multispectral encoding. For example, quantum dots are semiconductor nanocrystals of about 2-20 nm and are selected from groups IIB and group VIA, such as CdSe (cadmium selenide), CdS (cadmium sulfide), ZnSe (zinc selenide), etc. The fluorescence frequency is size dependent as, for example, CdSe particles of 2.8 nm show green fluorescence, while 5.6 nm show red fluorescence. These semiconductor nanoparticles such as CdSe, ZnSe, InAs, PbSe, etc. and combinations thereof emit light based on the electron confinement in particles with a radius less than about 10 nm. Thus, these particles also may be referred to as quantum dots, which are nanosized semiconductor crystals having a diameter between about 2 and about 10 nm, with each size quantum dot corresponding to a given emission peak. Quantum confinement of both the electron and hole in all three dimensions leads to an increase in the effective band gap of the material with decreasing crystallite size. Consequently, both the optical absorption and emission of quantum dots shift to the blue (higher energies) as the size of the dots become smaller.

The particles are monodispersed and the narrow size distribution allows the possibility of light emission in very narrow spectral widths. These small particles may be conventionally produced in an organic solvent with capping agents for colloid stabilization, such as trioctylphosphine, etc. These particles have a quantum yield of about 30-50% and emit narrow emissions characteristic to their size and band gap. Nanoparticles can be classified into groups that, for example, fluoresce in one of the narrow bands. Each group can, for instance, emit one of 15-30 discrete fluorescent emission wavelengths that can be detected separately which advantageously results in a considerable numbers of combinations. The ratio between the various emissions can be changed in a predictable way and large numbers of patterns can be created. These nanoparticles can be stabilized with non-ionic surfactants and dispersed in water. They are generally excited by broadband incident light in the visible range.

Another suitable type of nanoparticles includes microglass beads doped with rare earth ions excitable at short wave UV excitation of about of about 240 nm to less than about 300 nm, such as about 254 nm, or long wave UV excitation of about 320 to 380 nm. The glass beads may include rare earth ions such as Tb, Dy, Eu, Y, Pr, etc. in predetermined patterns or combinations or can be homogeneous with one rare earth element per bead. The beads are inert and can be dispersed in any carrier without interfering with the physical properties of the ink, as well as not changing the characteristics of the formulation. A particularly useful type of rare earth doped microglass bead includes a silica matrix for a stable fluorescent signal.

Rare earth-doped nanoparticles are very useful fluorescent taggants for ink as, for example, rare earth-doped glasses fluoresce in narrow emission bands. This allows a large amount of information to be encoded. They have high quantum efficiencies, thus, converting a large number of the absorbed incident shorter wavelength light to longer wavelength emissions in a narrow band. Because they are isolated by the glass, other components of the ink do not easily quench their fluorescence. These particles are also inert to most organic and aqueous solvents and thus can typically be added to any ink. They are non-reactive and, thus, do not attack materials of the printer. See Dejneka et al., Proceedings of the National Academy of Sciences of the United States (PNAS), Jan. 21, 2003, vol. 100, no. 2, 389-393. Moreover, the glass beads excitable at the afore-referenced long wave UV excitations are even more difficult to counterfeit than those excitable at shorter wave UV excitations as the long wave UV excitations are very narrow As described in the following reference "Novel Security system based on rare earth doped glass microbeads by Simon Officer and all, The Robert Gordon University, Aberdeen, AB 10 1FR, UK, Optical Document Security conference, Proceedings of SPIE, 2004. The foregoing microglass beads are micrometer-sized glass beads that can contain a pattern of different fluorescent materials easily identifiable by using a UV lamp and fluorospectrophotometer.

The nanotaggants can be delivered to any desired substrate, such as an envelope, etc., by ink carriers and preferably by digital inks, such as ink jet fluids. By preparing different inks either with one type of nanotaggant (for example, green) or with a predetermined combination of nanotaggants, various mixtures can be delivered to the substrate and information encoded accordingly.

As the nanotaggants can be used in the inks at very low concentrations (e.g. between about 0.5 and about 4 wt. %, typically about 1 wt. %, which is much less than in colored inks with contrast necessary for readability) very small drops in printing (e.g. less than about 1-2 pL) can be employed. By using multiple channel printers, as used for photorealistic applications, the MSETS can be delivered on a very small area on the substrate at a high speed without concern for positioning, satelliting or surface compliance. The spectral information can depend only on wavelength and intensity. This can present a huge advantage for delivering machine-readable information at high speeds with modern ink jet technology designed for photorealistic printing.

Accordingly, the nanotaggants comprising the afore-described nanoparticles may be employed as markers in ink. For example, they may be employed in jet inks for ink jet drop on demand technology. The desired type of nanoparticles may be combined with traditional ink formulation constituents to create an ink having a specialized marking and encoding system built therein. See also, commonly owned, co-pending U.S. patent application Ser. No. 11/267,002 describing fluorescent inks with special signature using rare earth complexes, the contents of which are hereby incorporated by reference.

An example of one type of suitable carrier for the MSET is now described. It is noted that this represents merely one example for illustration purposes only and any other desired ink/carrier may be employed. Thus, according to one embodiment, the ink may also comprise an aqueous liquid vehicle comprising water and a water soluble organic vehicle in sufficient amounts to achieve an ink viscosity and surface tension effective for application of the ink jet ink to a substrate in a predetermined pattern by ink jet printing. Water is desirable as the main solvent due to the large number of plastic materials used for ink jet printer parts. Water may typically be present in an amount between about 50 and about 90 weight percent, although other suitable amounts may be employed. Organic solvents may be employed but they have to be tested for compatibility since some organic based solvents may attack the plastic materials and interfere with the proper functioning of the parts. Other ink components commonly used in ink jet inks are: surfactants, binders, viscosity modifiers, humectants, penetrants, etc. as described in the referenced patents and in the application Ser. No. 11/262,002

The ink viscosity and surface tension of the ink jet ink should be such that it is effective for application of the ink jet ink to a substrate in a predetermined pattern by ink jet printing. For example the viscosity of the ink jet ink for use in some piezoelectric ink jet printers may be between about 1 and about 20 cps, and may be lower for thermal ink jet printers, such as between about 1 and about 5 cps. A desirable surface tension of the ink jet ink may be between about 30 and about 50 dynes/cm.

The weight percent of the nanoparticles in the ink formulation may vary, but typically may be from about 0.5 to about 4 weight percent of the formulation, and preferably about 1 weight percent. Other constituents may be employed within the ink formulations, such as those disclosed in U.S. Pat. Nos. 6,005,002, 5,674,314 and 5,919,846, 6,793,723 and U.S. Publication Number 2003/0005303A1, the contents of each of which are hereby incorporated by reference. Moreover, inks including the afore-described nanotaggants may be made by any suitable method known in the art for producing inks.

Accordingly, advantageously the afore-described nanotaggents may be employed as markers in ink jet drop on demand technology. For example, by mixing nanotaggants in various combinations using a carrier fluid, a high number of numerical combinations and, thus, unique codes (e.g. based on emission spectra comprising color and/or intensity) in real time may be achieved.

Bar codes may be created with the use of these nanotaggants and can be assigned in real time to, for example, one large customer (batches of mail) or to smaller batches, as well as to individual pieces of mails. The shape, position and orientation of these bar codes are advantageously not critical for the parsing and readability of the information, as described above.

Bar codes may be produced employing a variety of fluorescing nanoparticles such as the afore-referenced microglass beads, quantum dots and/or rare earth doped glass particles. These particles fluoresce in a narrow band controlled in part by the size and shape of the particle, such as a narrow bandwidth of about only 30 nm for example. The nanoparticles may be sorted into groups that fluoresce in a narrow band. These narrow band fluorescent nanoparticles or nanotaggants are suitable for addition to carriers such as inks used to produce bar codes. This narrow bandwidth can allow high spectral resolution and also allow physical overlapping markings without substantially interfering with the reading of the markings.

Because the nanotaggants do not interfere with each other, each of the bar codes can be read separately using a multispectral imager with narrow bandpass filters (<30 nm) which can image all of the bar codes separately at the same time. Alternatively, separate single channel imagers can each read only one of the distinguishable bands. If the separate imagers are at one place, or a multispectral imager is employed, a large amount of data can be read at one time.

Additionally, information transmitted to the Post using fluorescent nanotaggants can be hidden in image. Layered bar codes with two levels (present or absent) for each nanotaggant can be hidden in a grayscale or color image. That would make indicia unobtrusive, which in turn makes it more attractive from a user standpoint. For example, in the MSETS shown in FIG. 1A, both the first information marking 12 and the second information marking 14 are preferably printed with the same color ink as the carrier, but have different luminescent taggants with different and preferably spaced luminescence wavelength bands. However, one or both of the sub-component markings 12, 14 could comprise an invisible ink carrier.

Figure 5:
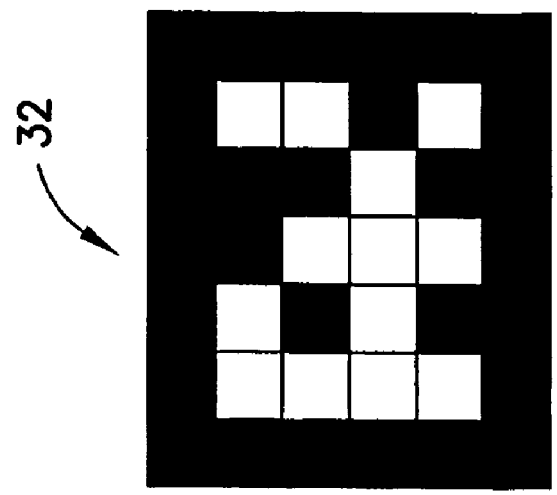
FIG. 5 illustrates a second one of the MSET channels used to form the MSETS shown in FIG. 3.
Figure 4:
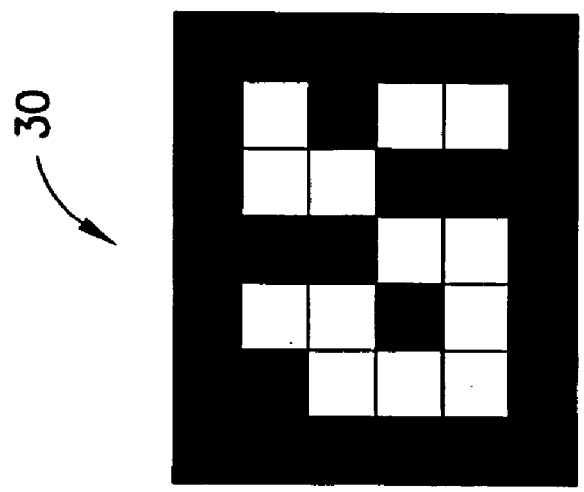
FIG. 4 illustrates a first one of the MSET channels used to form the MSETS shown in FIG. 3.
Figure 3:
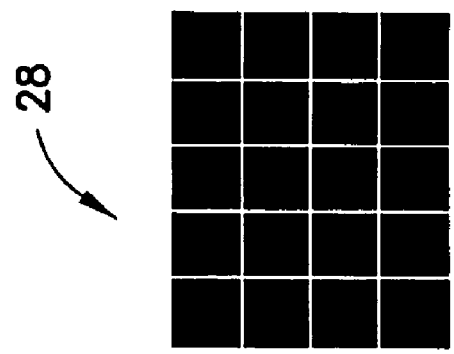
FIG. 3 illustrates another Multi-Spectral Encoded Tags (MSETS) with two MSET channels.

FIG. 3 shows a visible image of a portion of a layered bar code 28 comprising more than one different bar code, wherein each bar code comprises different information which is capable of being read and displayed separately. More particularly, FIG. 4 also shows a fluorescent image 30 at a first yellow wavelength and FIG. 5 shows a fluorescent image 32 at a second green wavelength. Advantageously, a different image is displayed for the yellow and green wavelength, thus, in the layered bar code 28.

A further benefit is that, because the bar code for each sub-component fluoresces strongly in a narrow band, it will appear very bright compared to the background and, thus, easy to detect and locate. An additional advantage is that there may be multiple bar codes that are each individually detectable.

Moreover, multiple, discriminating codes with different functions at different times and locations on the same "real estate" with black ink can constitute a problem for readability, involve limitations in processing, and can be obtrusive visually and cause confusion. The foregoing can solve these problems, as described above. Further advantages include security against interception of information and duplication, forensic features are also advantageously provided and the product code may be changed on demand. Moreover, information can be captured reliably under adverse conditions and a high density of information may be stored.

Benefits of fluorescence include encoding from, for example, 8 to 32 different inks (1 to 4 bytes per module). Multiple messages can be encoded in the same area using different inks without masking each other. A further example of the foregoing application can be the formation of a secure network of carriers, which can be certified to use the encoding system described herein. This is particularly advantageous as the scanning and verification may often be completed in less than ideal conditions and the robustness of spectral encoding (reading of spectral characteristics on the substrates) can considerably improve the read rate of portable scanners.

The nanotaggants described herein also may advantageously be detected with specialized array detectors or cameras with narrow filters that can identify these complex luminescence patterns and authenticate the codes.

Printing of a marking with the invention can include many different possibilities. The following are some examples:
  Printing a single marking with a single ink having multiple different taggants;
  Printing a combined marking having at lease two markings as sub-components to form the combined marking;
  Printing multiple markings (each with at least one of its own separate different taggant) spatially separate from each other;

Printing multiple markings (each with at least one of its own separate different taggant) spatially on top of each other; (overlapping)

and combinations of these.

These are only some examples. Different MSET channels can also be printed at about the same time by a same printer or at different times and with different printers, such as by different entities during different processes for example. However, even if printed at different times and with different printers, such as by different entities, the different MSET channels can be printed in a same space (at least partially overlapping) without interfering with subsequent reading of any one of the MSET channels. In addition, besides using wavelength to encode information, signal intensity can be used in addition to or as an alternative to wavelength encoding. For example, the two markings 30, 32 shown in FIGS. 4 and 5 could have different concentrations of taggants in the markings, but the taggants could be the same type in each marking. The detector could use signal intensity to determine the patterns of the markings 30, 32. Preferably, the taggants in the markings 30, 32 could be different as well as using different concentrations of taggants printed by the printer to communicate additional information using multiple concentration levels. Thus, both wavelength and signal intensity could be used to provide an even greater number of MSET channels.

A mail or document originator's printer might only use a single ink having a taggant. However, if the originator's printer is capable of printing multiple inks each having one or more different taggants, than printing can utilize selection of the different types of inks. The printer or a computer can utilize software to select which types of ink to use. For example, a user's computer could utilize a plug-in when creating a letter to print the POSTNET code in a first non-taggant ink when no special services are requested, but print the POSTNET code using a second (or more) taggant containing ink if a special service is requested. The selection of the ink(s) could be determined based upon which service is requested. Spatial combinations of the taggant containing inks could also be determined by the software, such as an algorithm or look-up table for example, based upon a requested service or perhaps for error correction or redundancy of the normal daylight visible information of the POSTNET code. These are only some examples. Other variations should be obvious after reading the present description.

Reading or detecting the marking(s) will occur somewhere after the marking(s) are printed. This could comprise, for example:

Detecting the presence of a taggant and removing a document to a special location for further processing; or Using an imager to extract information without removing a document to a special location for further processing.

For example, in a mail handling system using the first detecting method noted above, the mail handling machine could scan mail pieces for the presence of a taggant on the mail piece. If detected, the mail handling machine could eject the identified mail piece from a main mail stream of the machine and generate an alert, such as that the mail piece has a special service request for example.

There are a variety of multi-spectral imaging methods that may be employed in detection of the above codes. For example, a digital micro-mirror array may be employed. This device is an array of mirrors that can be individually tilted to deflect light into a beam or out of the beam. They may be used in some computer projectors and also may operate at video spreads. A pair of digital mirror arrays combined with imaging optics and a diffraction grating can be used to create a multi-spectral imaging system. This system produces a gray scale map of the image through a variety of spectral (wavelength dependent) filters. Generally, one of the arrays, the image domain array, selects combinations of wavelengths. Combining the arrays with appropriate optics allows detection of spectral characteristics of individual parts of an image.

An alternative solution is a set of narrow optical filters that can be manufactured by employing multiple defined layers with different refractive indices. The interference of light reflecting from the interfaces can produce a desired filter.

Targets with sharp spectral lines and well-defined ratios of spectral strengths, such as the luminescent taggants described herein, are ideal subjects for this type of multi-spectral imaging. Separate data can be encoded with each taggant because the imager can produce a complete gray scale image as seen through each filter. For example, data such as the source may be encoded into each nanotaggant. An imaging spectrometer tuned to the narrow bands or combination of bands may be employed because the emissions also are of a narrow band.

Figure 6:
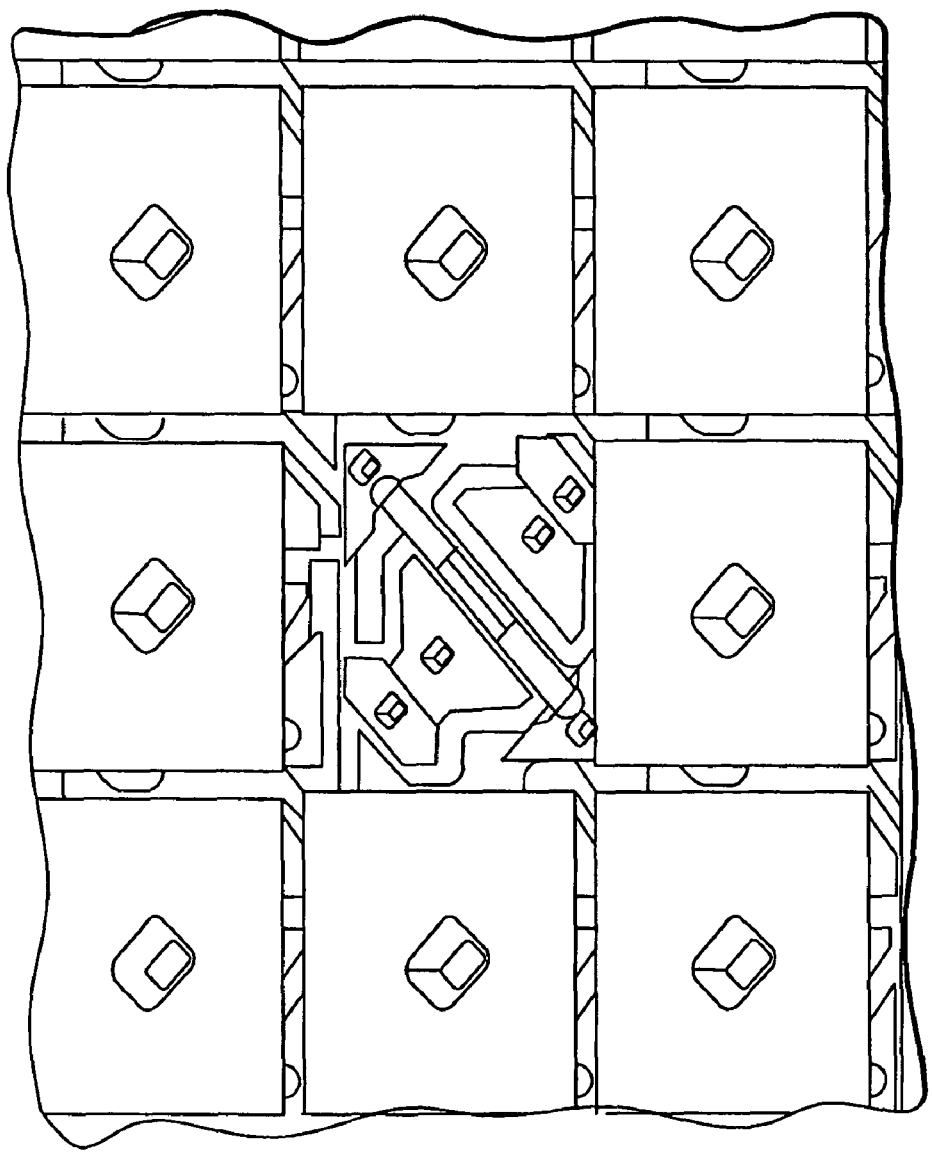
FIG. 6 is a mirror array used for multi-spectral imager.

In a preferred embodiment, an imager views the target passing by a slit. For ease of reference, the direction along the slit may be referred to an X and the direction of travel as Y. The Y coordinate of the target is proportional to time in the imager. The diffraction grating separates the incident wavelengths along lines parallel to the slit. The emissions from the target pass through or reflect off a diffraction grating, thus, producing a time (X) dependent spectrum for each Y coordinate. The resulting spectrum can be viewed with a 2D CCD array or preferably sampled using a mirror array, as shown in FIG. 6. In particular, FIG. 6 shows a MEMS mirror array. Accordingly, the bar codes can be scanned and decoded by the specialized detectors, which also may be added to conventional postal scanners. The results can be correlated to each other or used separately.

Another suitable type of detection and verification apparatus is disclosed in US 2005/0040234, the contents of which are herein incorporated by reference. For example, as disclosed therein, an indicia reading and verification apparatus includes two front-end modules, namely an indicia data reader and an ink characteristic detection module. The indicia reading and verification apparatus also includes a processing module which is coupled to the front-end modules to receive data therefrom. The processing module may include a conventional microprocessor or microcontroller and associated program and working memory. This removes the need for using a cumbersome, comprehensive database for verification.

The indicia data reader is able to read data included in printed form in a postage indicia. The data read from the postage indicia by the indicia data reader may be in the form of one or more symbols such as barcode elements or optically readable characters (which may also be standard human-readable characters). The data read by the indicia data reader may be in encrypted form. If the data is encrypted, the indicia data reader may be capable of decrypting the data, or may pass the encrypted data to the processing module for decryption by the processing module.

The data read from the indicia by the indicia data reader includes ink characteristic data that indicates one or more characteristics of the ink or inks that were used to print the indicia. The ink characteristic data may include one or more of a color or colors in which the indicia or portions thereof are printed, one or more spectral characteristics of the ink of the indicia, one or more luminescence characteristics (fluorescence and/or phosphorescence characteristic or characteristics), one or more light reflectance, absorbance and/or emission characteristics. The characteristics of the ink may pertain to visible and/or infrared light, for example.

The ink characteristic detection module operates by spectral analysis, color detection and/or filtering, luminescence detection or other visible or IR radiation detection to detect one or more optical characteristics of the ink or inks employed to print the indicia. The ink characteristic detection module generates ink characteristic data that is indicative of the ink characteristic or characteristics detected by the ink characteristic detection module and provides that data to the processing module. The ink characteristic detection module may include a spectrophotometer or a spectral scanner. The ink characteristic module also may include a color analyzer that can analyze and detect respective colors of various portions of the indicia, and a fluorescence and/or phosphorescence detector such as a fluorometer.

The processing module receives the ink characteristic data provided by the indicia data reader and by the ink characteristic detection module. If the data from the indicia data reader is in encrypted form, the processing module decrypts it. The processing module compares the decrypted ink characteristic data from the indicia data reader with the ink characteristic data generated by the ink characteristic detection module. If the two ink characteristic data match (i.e., both indicate the same ink or inks were used for the indicia or for the same portions of the indicia), then the processing module may determine that the indicia is verified. US 2003/0005303 discloses another method and system for validating a security marking, the contents of which also are incorporated by reference.

An advantage of embodiments of the invention is that the nanotaggants can add a physical layer of security to the encryption or visible watermarking, which is versatile, easy to refresh and works reliably with on demand printing. These nanotaggants also may be used covertly for various classes of customers. Examples include trusted mail senders, batches of customers by demographics, various mail volume uses, etc. Bar codes employing the nanotaggants advantageously can be verified at the destination by individual postal carriers, as well as by the major postal sorting facilities. Moreover, as rare earth taggants are phosphorescent, the first pass sorting can be completed for red and green bar codes by the existing AFCS luminescent detectors. The bar codes due to their versatility and uniqueness also can be applied as a last seal on highly secure documents. For instance, means such as ink jet printing, multiplexing and encoding in situ from various conventional cartridges, e.g. Epson with seven colors, may advantageously be employed.

A further significant advantage of embodiments of the invention is delivering information efficiently with high reliability of capture selectively at various steps in the mail processing. The future of mail communication system may be increasingly dependent on the ability of Posts to create and reliably deliver custom-tailored specialized communication and logistics services. Definition and delivery of such services in turn will be dependent on the ability of mailers and posts to create and execute effective exchange of information, especially using physical mail entities as one of the prime carriers of information. For example, mailer may instruct Post (i) to deliver a mail entity to a recipient on specific time/date, (ii) communicate back to mailer delivery confirmation and all difficulties encountered with delivery of the services (mail entity information defects), (iii) instructions of what to do with the mail entity and its digital image, payment and other attributes if mail entity could not be delivered as requested and (iv) provide information about physical structure identified in the address block. Such complex instructions may require a relatively large amount of information to be represented on the mail entity (much larger that traditional barcoded mail items could allow).

This large amount of information then will need be cost-effectively physically represented on the mail entity by mailers and reliably scanned by Posts at multiple points in the postal distribution network. Traditional bar codes including 2-dimensional high density bar codes may not be best suited for this environment. More efficient RFID tags may represent another set of difficulties, such as relatively high cost, particularly for one-time use applications. Embodiments of the present invention address these and other difficulties by using the afore-described specialized unique nanotaggants in inks that simultaneously deliver higher data density and reading reliability, traditionally the most difficult trade-off for a bar code designer.

Yet further advantages include an increased security due to spectral encoding, which is difficult to duplicate, increased tolerance to positioning of the reader or scanner, shape of surface, etc., and possibility of scanning and verification at remote locations. Further advantages of embodiments of the invention include the use of a mixture of nanotaggants with multiple excitation wavelengths for added security, and the ability to use a combination of different types of nanotaggants.

There are a variety of fluorescing nanoparticles such as quantum dots or rare earth doped glass particles. These particles fluoresce in a narrow band controlled in part by the size and shape of the particle. It is known to sort quantum dots into groups that fluoresce in a narrow band. These narrow-band fluorescent nanoparticles are suitable for addition to carriers such as ink jet inks and will be referred to generally as nanotaggants. $N_c$ printer channels can be supplied with different types of ink including nanotaggants such that each type of ink fluoresces in a different, distinguishable band when excited with broadband UV or visible light, where C is an integer and N represents a printer channel, such as printer channels $N_1$, $N_2$, $N_3$, etc.

The $N_c$ channels can be used to provide increased information density in a printed symbology. As an example, if the basic symbology is a barcode, a symbol can be printed that includes $N_c$ barcodes printed over the same area. Each of the barcodes is printed with one of the inks and, thus, fluoresces in one of the narrow bands. While we refer here to barcodes, other symbologies can be employed including text characters, watermarks, glyphs, multilevel codes that associate different values with different intensities, or any other symbology. The symbology printed with each of the inks can be different.

A multi-channel printer can provide the $N_c$ channels, thus, increasing the amount of information that can be printed in a given area at one time. Alternatively, multiple printers can be employed to apply the $N_c$ inks, possibly at different times. For example in the mail production process, the originator of the mail piece can print information about the purpose of the mail piece, the level of service required can be printed using a second ink. The postage meter can read the level of service required and print postage evidence using a third ink. The postal processing system can print sortation instructions using a fourth ink and the carrier can print delivery information using a fifth ink. An advantage of the invention is that each barcode is imaged separately, so it is not necessary to accurately align the separate barcodes. This greatly simplifies the production process, because the print does not require a prior scanning to determine the correct location.

Because the nanotaggants do not interfere with each other, each of the barcodes can be read separately using a multispectral imager. The imager can image all of the barcodes separately at the same time. Alternatively, separate single channel imagers can each read only one of the distinguishable bands. If the separate imagers are at one place, or a multispectral imager is employed, a large amount of data can be read at one time.

If the purpose of the individual barcodes is to provide different information to a process at different stages of the process, then the imagers can be used at different locations in the process so that each imager reads only the information needed for that step. For example, in mail processing, information about the action required at delivery is needed only at the delivery point, while address information is needed when sorting the mail. The mailer may require different information for internal processing of the mail and the recipient may require yet other information for properly processing received mail. If the barcode includes all of the information required at each of these process steps, then the barcode would be large and intrusive or the modules of the barcode would be small and difficult to read reliably.

A further benefit of the invention is that because the barcode for each step fluoresces strongly in a narrow band it will appear very bright compared to the background and, thus, easy to detect and locate. Here, there is the additional advantage that there are multiple barcodes that are each individually detectable. Printing multiple, discriminating codes with different functions at different times and locations on the same "real estate" with black ink constitutes a problem for readability, involves limitations in processing, is obtrusive visually and can cause confusion.

Use of the invention does not require creation of a combined marking, although two or more markings could be printed at least partially over each other. For example, an originator could print a POSTNET code on an envelope. The first POSTNET code could be printed as a first information marking with a color ink having first luminescent taggants having a first luminescence narrow wavelength band, such as only about 30 nm for example. A post office, recognizing that the addressee has moved, could print a second POSTNET code on top of the first POSTNET code. The second POSTNET code could be printed as a second information marking with an ink having second different luminescent taggants having a second different luminescence narrow wavelength band, such as only about 30 nm for example, spaced from the first luminescence narrow wavelength band. Even though the second marking is printed at least partially on top of the first marking, both markings can be read or distinguished separately from each other because of their different luminescence wavelength bands. Thus, the first information marking does not need to be covered over or blocked. The two markings can be overlapping, but non-intrusive relative to each other.

In the example given above, if the reader is able to read both POSTNET markings, the reader could be adapted to automatically give priority to the second POSTNET code based upon the taggant present in the second POSTNET code versus the taggant present in the second POSTNET code. Thus, in addition to being able to read the POSTNET bar codes, the reader could also detect the type of taggants used in the ink/carrier used to print the codes and give priority to the second code based upon a predetermine criteria, such as a look-up table for example. For example, a reader used by the mail deliverer or destination post office could have a display or mail handling machine that could read both the first code and the second code, but ignore the first code and use only the second code if the second code is printed with a predetermined type of taggant. Thus, different taggants could be used to prioritize different, otherwise conflicting instructions or information.

Figure 7:
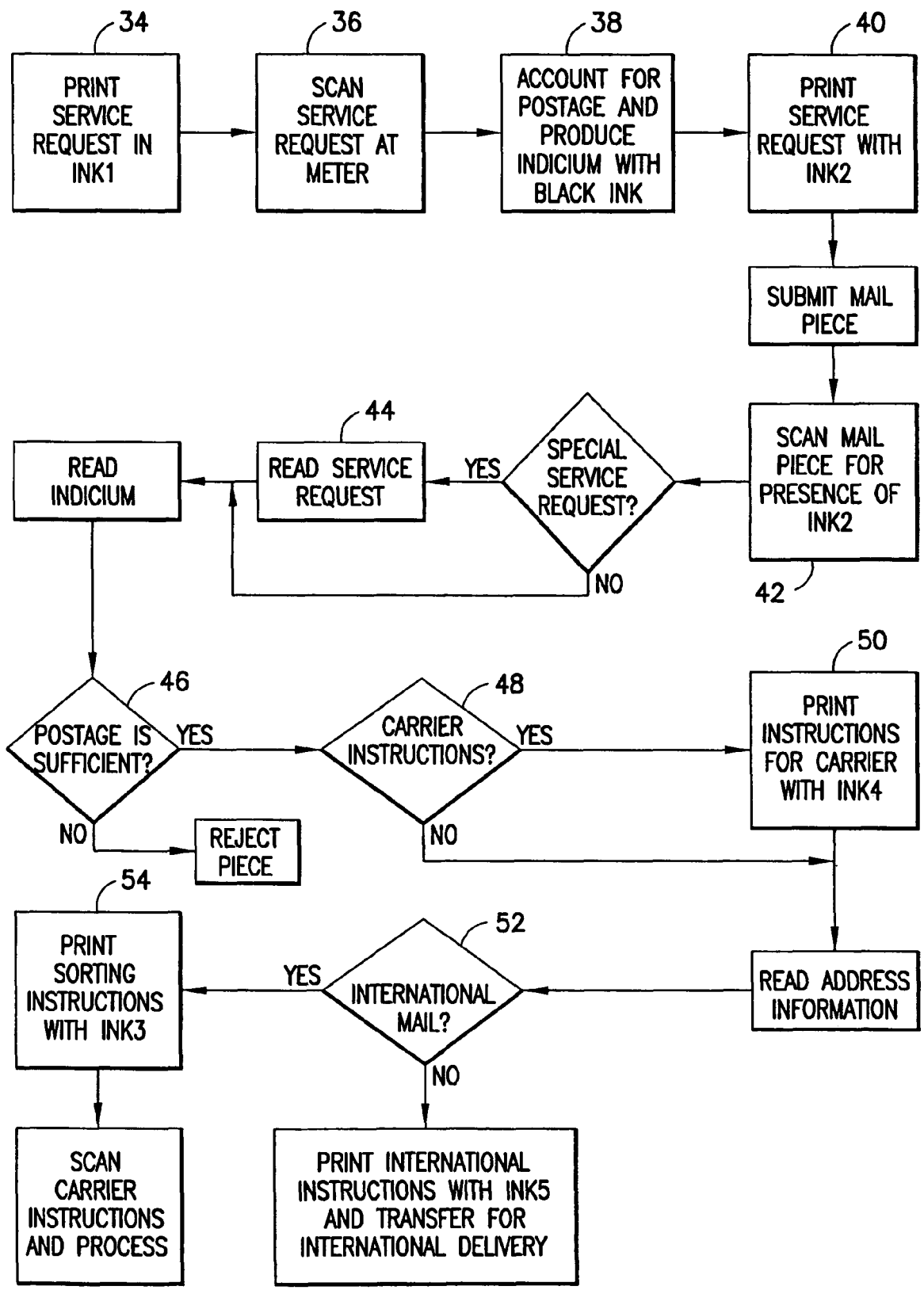
FIG. 7 illustrates one example of the use of a MSETS at multiple steps in a mail processing system.

A typical flowchart for an application of a MSETS to a mail stream application is illustrated in FIG. 7. The mailer prints a request for service in a first ink (ink 1) as indicated by block 34. The meter (or a mail finishing machine more generally) in the mailer's mailroom scans at 36 the service request, determines the correct postage amount and prints the indicium as indicated by block 38. The service request is printed at 40 with MSET channel 2 ink. The originating post office scans at 42 mail pieces for presence of ink 2. It is not necessary to use a reader at this point as a simple detection system can identify and signal the presence of the ink 2. If the ink 2 is present the special service request is read at 44. After reading the service request, determinations at step 46 and step 48 are made whether 1) the indicium contains sufficient postage, and 2) whether there are special mail carrier instructions. The carrier instructions are then printed at 50 with the ink 4 which will later be scanned by the mail carrier. In the process of sorting the mail a determination at 52 is made whether the mail piece is international. If it is international then instructions to the international post are printed at 54 with ink 5. These instructions may include, for example, the necessary identifier and contact information for delivery confirmation. If the mail piece is not international, then the mail piece is processed normally and the carrier scans the special instructions.

Several players can process a mail piece being transferred from an Originator to a Receiver. These players must act on information about the mail piece, add additional information, and process the physical mail piece. We group these players into seven parties. In the order that they see the mail item, they are:

The originator is the party with the need for sending the mail item.

The originator's mailroom is the creator of the finished mail item.

The originating postal operator is the postal operator that accepts the mail piece An authorized third party is any party with a potential legal right to information about the mail piece such as law enforcement and customs.

The destination postal operator is the postal operator responsible for delivering the mail piece.

The recipient's mailroom is the recipient's facility for accepting the mail piece from the destination postal operator.

The recipient is the individual or business process.

Figure 8:
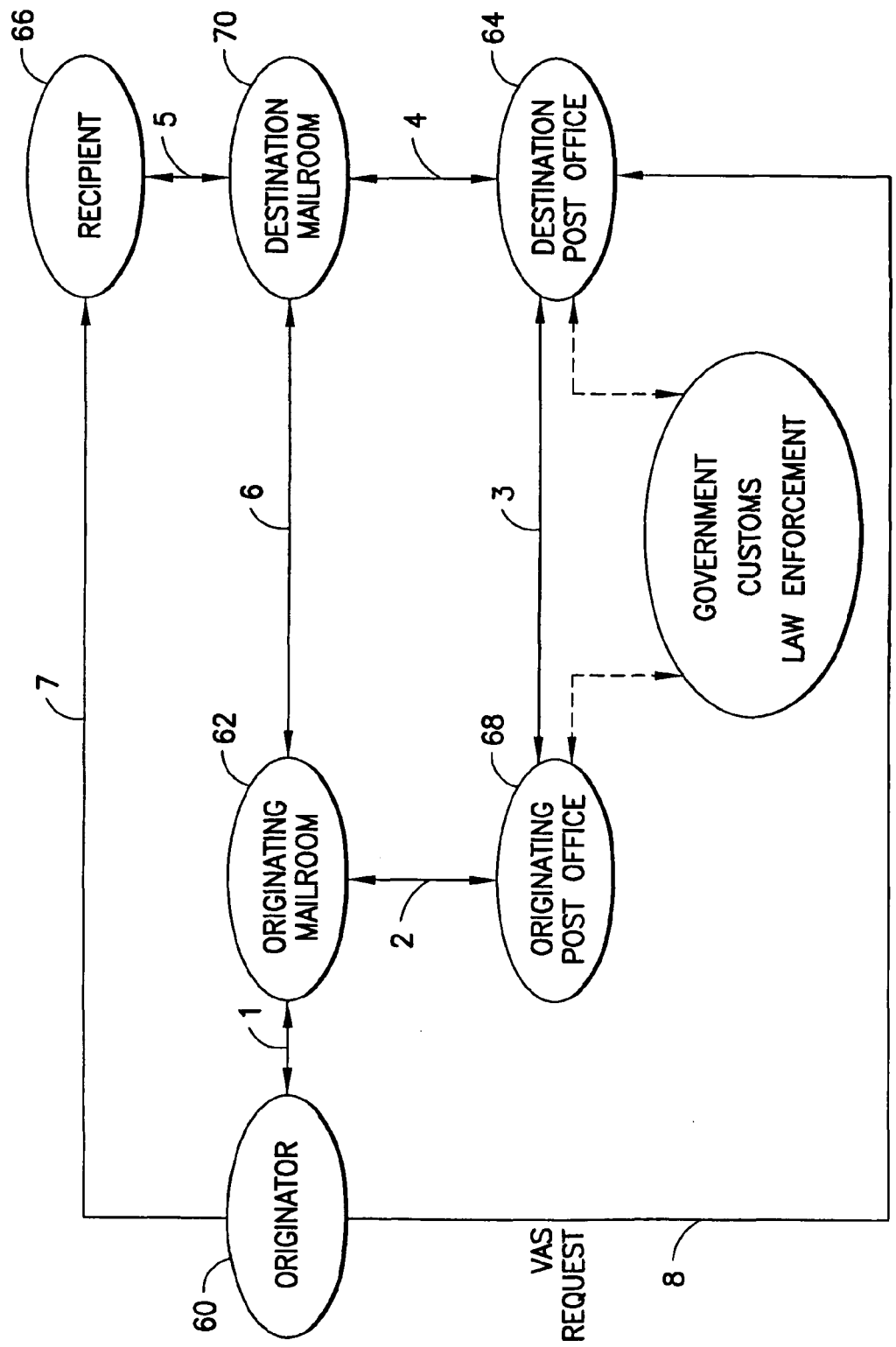
FIG. 8 illustrates some of the large number of different MSET channels enabled by a MSETS.

Each player involved in moving a mail item from the originator to the recipient will perform a series of steps. Seven parties participating in the mail process are illustrated in FIG. 8. More or less than seven parties could be provided. MSETS allow over 20 different communication channels using an ink dedicated to each channel. Each ink has a narrow band of fluorescence emissions. Each party can communicate downstream, i.e., to parties who see the mail item at a later step in the process. There are seven parties who can communicate downstream using MSETS requiring 7*6/2=21 channels. This is possible in the same location on the mail item due to the narrow frequency bands and non-interference of the different MSETS.

FIG. 8 illustrates an example of downstream information flow concerning a mail item. The following list provides examples of information that may be communicated via MSETS. The roles of recipient and originator may be subsumed by their mailroom, other than the originators message to the originator's mailroom. Although we have shown each message as between two parties, it is possible for any party to read any of the MSETS printed on the mail item. For example, the destination postal operator may read messages intended for the origin postal operator. In the following, any "request" may include an electronic address or other channel for information delivery to the upstream requesting party. Not all of the following messages are shown in FIG. 8:

Originator 60 to Originator's mailroom 62 (message 1): VAS (value added service) request, cost center, originator ID (include electronic address), internal mail item identifier Originator 60 to Originating postal operator message: Proof of mailing request (postmark date)

Originator 60 to Authorized third party: Permission to open, Request for confirmation that they have information about the mail item, Contents, declared value, Request report on item status in customs Originator 60 to Destination postal operator 64 (message 8): Delivery confirmation/tracking request (include electronic address)

Originator 60 to Recipient's mail room: Return receipt request

Originator 60 to Recipient 66 (message 7): Confirmation of processing the mail item Originator's mailroom 62 to Originating postal operator 68 (message 2): Payment evidence, proof of mailing request, VAS indicator/code, VAS identifier Originator's mailroom 62 to Authorized third party: Permission to open, Request for confirmation that they have information about the mail item, Contents, declared value, Request report on item status in customs Originator's mailroom 62 to Destination postal operator 64: Delivery status request, VAS indicator/code, VAS identifier, return or other disposition request with conditions such as deliverability time of delivery Originator's mailroom 62 to Recipient's mail room 70 (message 6): Return receipt request, request location change for individual, Incoming mail processing machine, encode for automatic sorting of incoming mail, urgency code, individual identifier Originator's mailroom 62 to Recipient 66: Request confirmation of processing the mail item, (e.g., check or legal document)

Originating postal operator 68 to Authorized third party: Request for confirmation that they have information about the mail item Originating postal operator 68 to Destination postal operator 64 (message 3): They operate on the postal ID tag, at level of mail aggregate—status, mail entity information, timing of events-urgency to process, processing needs, Expectation, Registered mail item, request for international value added service. How you expect to make event information accessible.

Originating postal operator 68 to Recipient's mailroom 70: Address and other information correction request Originating postal operator 68 to Recipient 66: Proof of mailing Authorized third party to Destination postal operator 64: Evidence that the piece has been processed through customs, request to collect duty from the recipient Authorized third party to Recipient's mailroom 70: Evidence for customs duty for internal accounting, linked to a bill Authorized third party to Recipient 66: Evidence for customs duty for internal accounting, linked to a bill Destination postal operator 64 to Recipient's mailroom 70 (message 4): Address and other information correction request, Recipient ID Destination postal operator 64 to Recipient 66: Address and other information correction request, Recipient's mailroom 70 to Recipient 66 (message 5): Date received Each participant preferably utilizes a detection system that is able to receive messages intended for that recipient. Multi-spectral imagers (also called hyperspectral imagers) are known that use filters, diffraction gratings or MEMS mirror arrays. The imager described by Fately, Coifman, et al, in U.S. Pat. No. 6,859,275 is suitable for this application. A mirror array that can be used in a multi-spectral imager is illustrated in FIG. 6. Each participant preferably has a printer capable of printing on any downstream channel to whom the participant wishes to communicate. This would simply be a multi-channel printer.

A participating party receives a mail item for processing and scans the mail item for a MSETS or MSET channel. If no MSETS or MSET channel intended for this participant are detected, the participant processes the item normally 16. If, however, a MSETS or MSET channel intended for this participant is detected, then the participant reads the MSETS or MSET channel and determines the processing instructions. The participant determines at whether any requests for information about the mail item are encoded in the MSETS or MSET channel. If so, the requested information is generated and transferred via the channel identified in the request. The participant determines, according to mail item processing procedural instructions, whether there is a need to provide information downstream to parties who will handle the mail item later in the process. If no such information is required, the mail item is processed normally. If such information is required, the participant can construct the message by formatting and encoding the required information. Encoding can include encryption, adding a digital signature, or adding an error correction code. The message can then be printed using ink assigned for communication from the participant to the downstream party. Alternatively some information could be communicated electronically.

Postal services print a mail piece identifier using a low-visibility fluorescent bar code known as a postal-ID tag. The postal-ID tag fluoresces in a broad band of wavelengths and can be excited with a broad band of wavelengths so printing or paper on the mail piece has a similar fluorescence confuses the postal sorter's detection system. MSETS provide a uniquely distinguishable narrow wavelength band signal that is easily separated from background fluorescence.

As noted above, postage meters can print indicia with two-dimensional barcodes that provide postage payment evidence. The indicium barcode can include value-added service requests. The provider of that value-added service would have to read every barcode to find the ones that actually request service. An indicium that includes a unique MSET only when requesting a value-added service is reliably detectable without the necessity of decoding the barcode to determine if a particular service is requested. Indicia printed with MSETS have the additional advantage that any simple attempts to make copies with a different ink are easily detected. MSETS can have narrow wavelength bands with minimal overlap so that they create multiple independent channels for communicating using the same area. The independent MSET channels can be printed in the same area of the envelope at widely separated times and at different steps in the process.

The example above regarding the conventional no space assigned for a third POSTNET code, and typically placing a label with the new code over the existing POSTNET code, notes a problem in the art. MSETS resolve this problem.

There are enough MSET channels to allow each step in the process to use a unique wavelength band to print its information on the mail piece. A sorter that processes this mail piece will realize that the code for the changed address has the highest priority and use that code to sort the mail piece.

As noted above, due to limited area of an envelope, the postal service issues regulations that define the required placement of bar codes, clear zones and other information on a mail piece. The resulting mail piece can be cluttered and confusing. MSETS overcome this limitation because there is no constraint on the physical overlap of different MSET channels.

In accordance with one embodiment of the invention, a multi-spectral encoded tag for printing machine readable information on a substrate is disclosed. The multispectral encoded tag comprises: a mixture of different, luminescent inert nanotaggants having a bandwidth of less than about 30 nm for providing physical encoding for data and security applications, wherein the nanotaggents comprise nanoparticles. Each different nanotaggant is capable of being detected separately by its wavelength. The nanoparticles are selected from the group consisting of semiconductor nanoparticles, microglass beads doped with at least one rare earth ion and excitable at a UV excitation of about 240 nm to less than about 300 nm, and microglass beads doped with at least one rare earth ion and excitable at a UV excitation of between about 320 nm and about 380 nm, and combinations thereof. The multispectral encoded tag further comprises a carrier vehicle in a sufficient amount to achieve an ink viscosity and surface tension effective for application of the tag to the substrate in a predetermined pattern by printing. In accordance with a further embodiment, an article such as an envelope containing the afore-referenced multispectral encoded tag is disclosed.

In accordance with another embodiment of the invention, a printed security label comprising a code digitally printed with a multispectral encoded tag is disclosed. The multispectral encoded tag comprises a mixture of different, luminescent inert nanotaggants having a bandwidth of less than about 30 nm for providing physical encoding for data and security applications, wherein the nanotaggents comprise nanoparticles. Each different nanotaggant is capable of being detected separately by its wavelength. The nanoparticles are selected from the group consisting of semiconductor nanoparticles, microglass beads doped with at least one rare earth ion and excitable at a UV excitation of about 240 nm to less than about 300, and microglass beads doped with at least one rare earth ion and excitable at a UV excitation of between about 320 nm and about 380 nm, and combinations thereof. The multispectral encoded tag further comprises a carrier vehicle sufficient to achieve an ink viscosity and surface tension effective for application of the tag to the substrate in a predetermined pattern by printing.

Also disclosed in accordance with an embodiment of the invention is a system for encoding information. The system comprises a multispectral encoded tag, which comprises a mixture of different, luminescent inert nanotaggants having a bandwidth of less than about 30 nm for providing physical encoding for data and security applications embedded in an ink, wherein the nanotaggents comprise nanoparticles selected from the group consisting of semiconductor nanoparticles, microglass beads doped with at least one rare earth ion and excitable at a UV excitation of about 240 nm to less than about 300 nm, and microglass beads doped with at least one rare earth ion and excitable at a UV excitation of between about 320 nm and about 380 nm, and combinations thereof. Each different nanotaggant is capable of being detected separately by its wavelength. The system further comprises a security label printed on a substrate using the ink embedded with the inert nanotaggants; wherein the information is encoded in the spectral profile of the nanotaggants and can be decoded without requiring precise orientation and positioning of the security label.

In accordance with a further embodiment of the invention, a method for detecting encoded information is disclosed. The method comprises: providing a target including encoded information, wherein the target comprises a printed label comprising a code printed with a multispectral encoded tag. The multispectral encoded tag comprises a mixture of different, luminescent inert nanotaggants having a bandwidth of less than about 30 nm for providing physical encoding for data and security applications, wherein the nanotaggants comprise nanoparticles selected from the group consisting of semiconductor nanoparticles, microglass beads doped with at least one rare earth ion and excitable at a UV excitation of about 240 nm to less than about 300 nm, and microglass beads doped with at least one rare earth ion and excitable at a UV excitation of between about 320 nm and about 380 nm, and combinations thereof. Each different nanotaggant is capable of being detected separately by its wavelength. The multispectral encoded tag further comprises a carrier vehicle sufficient to achieve an ink viscosity and surface tension effective for application of the tag to the substrate in a predetermined pattern by printing. The method further comprises exposing the target to an array device, wherein the array device detects spectral characteristics of each nanotaggant to read and authenticate the encoded information.

In accordance with another embodiment of the invention, a system for decoding information is disclosed. The system comprises an array device which detects spectral characteristics of encoded information of a target. The target comprises a printed label comprising a code printed with an multispectral encoded tag. The multispectral encoded tag comprises a mixture of different, luminescent inert nanotaggants having a bandwidth of less than about 30 nm for providing physical encoding for data and security applications, wherein the nanotaggents comprise nanoparticles selected from the group consisting of semiconductor nanoparticles, microglass beads doped with at least one rare earth ion and excitable at a UV excitation of about 240 nm to less than about 300 nm, and microglass beads doped with at least one rare earth ion and excitable at a UV excitation of between about 320 nm and about 380 nm, and combinations thereof. Each different nanotaggant is capable of being detected separately by its wavelength. The multispectral encoded tag further comprises a carrier vehicle in a sufficient amount to achieve an ink viscosity and surface tension effective for application of the tag to the substrate in a predetermined pattern by printing. Data also is encoded in each nanotaggant and the array device detects the spectral characteristics of each nanotaggant to read and authenticate the encoded information.

The term "substantially luminescently non-intrusive" means that an optical filter can separate the luminescent emissions from the first information marking from the luminescent emissions of the second information marking so that each information marking can be read reliably. The first information marking can be enclosed within a first minimal convex region. As an example, if the first information marking is a DataMatrix barcode, then the first minimal convex region is the smallest rectangle enclosing the barcode. Similarly, the second information marking can be enclosed within second minimal convex region. The overlap location can be the intersection of the first and second minimal convex regions.

While the preferred form for an information marking is a barcode, the term "information marking" includes text, linear barcodes, 2D barcodes, OCR fonts, watermarks, dataglyphs, any icon image, or simply the presence of a luminescent emission in a narrow band. Further, the term "information marking" includes a grayscale code where information is encoded in the level of fluorescent emissions from each region of the information marking. For example, an information marking could include a code employing four levels where the levels are an absence of emission, low level emission, mid-level emission and maximum level emission which encodes two bits per region. The preferred mode of printing is ink jet. However, printing includes any method of placing the luminescent taggants such as electrophotgraphy, dry or liquid toners, thermal transfer, or dye diffusion for example.

Reading by luminescence can comprise distinguishing the emissions from the narrow band luminescence from background luminescence and from other MSET channels, detecting an image in the narrow band luminescent emissions, and extracting data from image. "Distinguishably luminescently readable" means that, through the use of a suitable optical bandpass filter for example, the first information marking can be read using the luminescent emissions of the first luminescent taggants, independent of the presence of the second luminescent emissions.

As an example, consider a mailpiece going from a mailer to a third party presort mail facility and then to a postal facility. The mailer places a destination barcode with a first MSET. The presort mail facility may identify that the mailer placed destination barcode is incorrect and corrects the destination barcode by printing a second destination barcode with a second luminescent tag. The postal facility recognizes that the second destination barcode has priority, but may have updated information that the recipient has moved and print a third destination barcode with a third luminescent tag. Following postal sorters will recognize that the third destination barcode has priority over the other two.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A method of reading a multi-spectral marking on a document using a reader device comprising:
   reading by luminescence a first marking of the multi-spectral marking having first luminescent particles using the reader device;
   reading by luminescence a second marking of the multi-spectral marking having second different luminescent particles using the reader device; and
   prioritizing information contained in the first marking versus information contained in the second marking based upon a predetermined prioritization.

2. A method of handling a mail piece in a mail handling machine having a luminescent reader device comprising:
   reading by luminescence a first marking of a multi-spectral marking on the mail piece using the luminescent reader device while the mail piece is in a main stream of a mail handling machine, wherein the first marking comprises first luminescent particles;
   when the first marking is determined to comprise a predetermined characteristic, automatically removing the mail piece from the mail stream using the mail handling machine; and
   processing the mail piece based upon information contained in the first marking.

3. A luminescent reader device for reading a multi-spectral marking comprising:
   a detector including a processor and associated program memory and working memory, the associated program memory including instructions to cause the detector to:
   read by luminescence a first marking of the multi-spectral marking having first luminescent particles;
   read by luminescence a second marking of the multi-spectral marking having second different luminescent particles; and
   prioritize one of the first and second markings using information contained in the first marking, information contained in the second marking and priority data obtained from a predetermined prioritization table stored in the working memory.

* * * * *